(12) United States Patent
Noichi

(10) Patent No.: US 8,469,132 B2
(45) Date of Patent: Jun. 25, 2013

(54) BODY FRAME

(75) Inventor: Fumihiko Noichi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 661 days.

(21) Appl. No.: 12/026,416

(22) Filed: Feb. 5, 2008

(65) Prior Publication Data

US 2008/0185209 A1    Aug. 7, 2008

(30) Foreign Application Priority Data

Feb. 5, 2007  (JP) ................................ 2007-025123

(51) Int. Cl.
- B62D 21/00    (2006.01)
- B62D 27/02    (2006.01)
- B62K 19/20    (2006.01)

(52) U.S. Cl.
USPC ......... 180/219; 180/311; 280/281.1; 280/798

(58) Field of Classification Search
USPC ............... 180/219, 311; 280/281.1, 791, 797, 280/798, 274, 288.3; 72/58; 29/432, 445, 29/897.312, 514; 228/173.4
See application file for complete search history.

(56) References Cited

U.S. PATENT DOCUMENTS

| | | | | |
|---|---|---|---|---|
| 4,899,843 A * | 2/1990 | Takano et al. | ................. | 180/312 |
| 4,986,597 A * | 1/1991 | Clausen | ........................ | 296/205 |
| 5,839,776 A * | 11/1998 | Clausen et al. | .......... | 296/187.03 |
| 5,984,336 A * | 11/1999 | Hanafusa et al. | .......... | 280/281.1 |
| 6,446,996 B1 * | 9/2002 | Horii | .......................... | 280/281.1 |
| 6,695,330 B2 * | 2/2004 | Hata | ........................... | 280/152.3 |
| 6,799,781 B2 * | 10/2004 | Rasidescu et al. | ............. | 280/781 |
| 2005/0115758 A1 * | 6/2005 | Yamashita | ..................... | 180/311 |
| 2006/0283650 A1 * | 12/2006 | Kawamura et al. | ........... | 180/227 |
| 2007/0216132 A1 * | 9/2007 | Ozawa | ........................ | 280/304.5 |

FOREIGN PATENT DOCUMENTS

| | | | |
|---|---|---|---|
| JP | 402006286 | * | 1/1990 |
| JP | 05-262269 | | 10/1993 |

* cited by examiner

*Primary Examiner* — Anne Marie M Boehler
(74) *Attorney, Agent, or Firm* — Keating & Bennett, LLP

(57) ABSTRACT

A body frame for a motorcycle includes a seat rail formed from a circular pipe that extends horizontally rearward from an upper rear end of a main frame. A backstay formed from a square pipe extends obliquely upward and rearward from a lower rear end of the main frame. A bent part formed at a rear end of the backstay faces the seat rail in the longitudinal direction. Projecting parts are formed on both sides of a concave groove formed in an upper surface of the backstay. The projecting parts are offset in the width direction with respect to a center line of the seat rail and the backstay to allow the seat rail and the backstay to be easily welded.

16 Claims, 8 Drawing Sheets

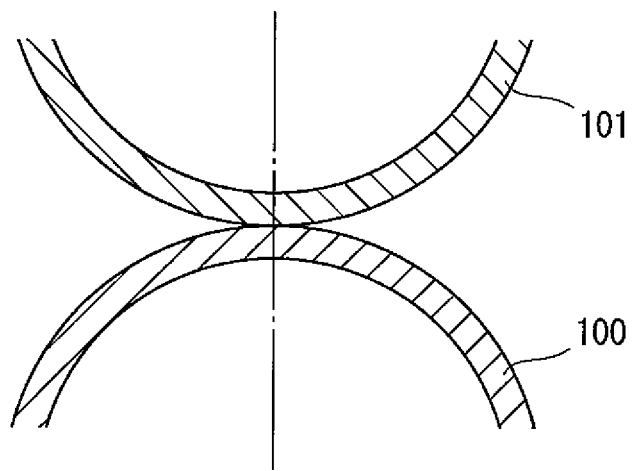
Prior Art  Fig. 7

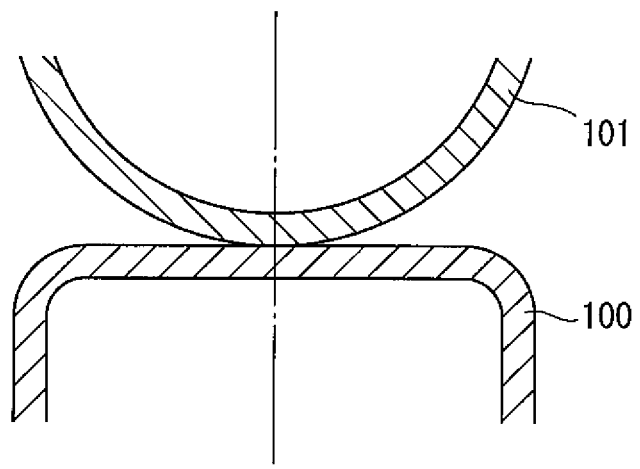
Prior Art  Fig. 8

BODY FRAME

RELATED APPLICATIONS

This application claims the benefit of priority under 35 USC 119 of Japanese patent application no. 2007-025123, filed on Feb. 5, 2007, which application is hereby incorporated by reference in its entirety.

BACKGROUND OF THE INVENTION

1. Field of the Invention

The invention relates to a body frame of a straddle-type vehicle such as a motorcycle.

2. Description of Related Art

A rear frame of a motorcycle is conventionally formed from a seat rail extending substantially horizontally and rearward from an upper rear part of a main frame, and a backstay extending obliquely upward and rearward from a lower rear part of the main frame. An upper end of the backstay faces and is welded to a rear end of the seat rail. See, for example, JP-A-H05-262269.

The area of welding of the backstay and seat rail is preferably large to improve the strength of the connection. Thus, predetermined areas of the backstay and the seat rail facing each other along a longitudinal direction are welded together. As shown in FIG. 7, a backstay 100 and a seat rail 101 are conventionally formed from circular pipes. A sideward opening angle between the circular pipes is large, and a welding torch can easily approach a center part of the facing areas. However, when a square pipe is used for backstay 100 or seat rail 101, as shown in FIG. 8, the sideward opening angle between backstay 100 and seat rail 101 is small and a welding torch cannot easily enter. Thus, the conventional connection form cannot easily accommodate a design using a circular and a square pipe.

SUMMARY OF THE INVENTION

The invention addresses this situation and provides a body frame formed from pipes facing each other along a longitudinal direction that are easily welded.

A body frame according to the invention includes a first pipe extending in an axial direction and including a curved surface part having an arc-shaped cross section. A second pipe extends along the axial direction and faces the curved surface part along the longitudinal direction, and includes a projecting part offset outward in a width direction with respect to a center line of the first and second pipes. A welding part welds the curved surface part and the projecting part.

In accordance with the invention, plural pipes face each other over a predetermined length for welding. Accordingly, sufficient connection strength is achieved even there is no bracket or the like for connection. A projecting part is offset in a width direction with respect to a center line through the pipes. Thus, the connection part of the pipes is located close to the outer side, and a welding device is able to approach the connection part so that stable welding is achieved.

In one embodiment, the first pipe is circular. The second pipe is square and has a width substantially equal to that of the first pipe. A concave groove is formed on a surface of the second pipe facing the first pipe along the longitudinal direction. The center line passes through the concave groove and the projecting part is offset in the width direction with respect to the center line of the concave groove. Thus, the body frame can be formed by connection of pipe materials having different cross sections. Further, forming the concave groove by a pressing operation causes parts offset in the width direction to relatively project to form the projecting part. Accordingly, the projecting part can be formed by a simple process.

In one embodiment, projecting parts are formed on both sides of the concave groove in the width direction. Thus, there are two welding parts inside and outside the concave groove, and connection strength is improved.

In one embodiment, a gap for draining is formed between the concave groove and the first pipe. Accordingly, rinse liquid or the like does not remain between the pipes.

In one embodiment, first and second pipes are provided on both sides in the width direction, and either the first or second pipes are seat rails for supporting a seat. Accordingly, two pairs of pipes are stably welded to secure sufficient supporting strength for the seat.

In one embodiment, the first pipe is a seat rail having one end connected to an upper rear part of a main frame and an other end extending substantially horizontally rearward. The second pipe is a backstay having one end connected to a lower rear part of the main frame and an other end extending obliquely upward and rearward. A bent part is formed at an other end of the second pipe and faces the other end of the first pipe along the longitudinal direction. The welding part is provided between the projecting part formed in the bent part and the other end of the first pipe. Accordingly, the bent part formed to be welded faces the first pipe along the longitudinal direction in connecting an end of the seat rail extending substantially horizontally rearward from the upper part of the main frame and an end of the backstay extending obliquely upward and rearward from the lower part of the main frame, as opposed to a usual case in which a bracket provided at an end of the backstay carries out the connection with the seat rail. Accordingly, sufficient connection strength is achieved without using a bracket.

In one embodiment, a glove bar is bridged over the rear ends of the seat rails, in the invention. Thus, the glove bar is mounted in the vicinity of the connection part of the pipes and force operated on the glove bar is certainly received.

In one embodiment, a support bracket for mounting the glove bar is provided at rear ends of the seat rail and overlaps the connection of the seat rail and the bent part in the longitudinal direction. Accordingly, an external force from a passenger holding the glove bar is surely resisted.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 7 is a sectional view showing a problem of conventional technology.

FIG. 8 is a sectional view showing a problem of conventional technology.

DETAILED DESCRIPTION OF THE INVENTION

Embodiment 1

Figure 1:
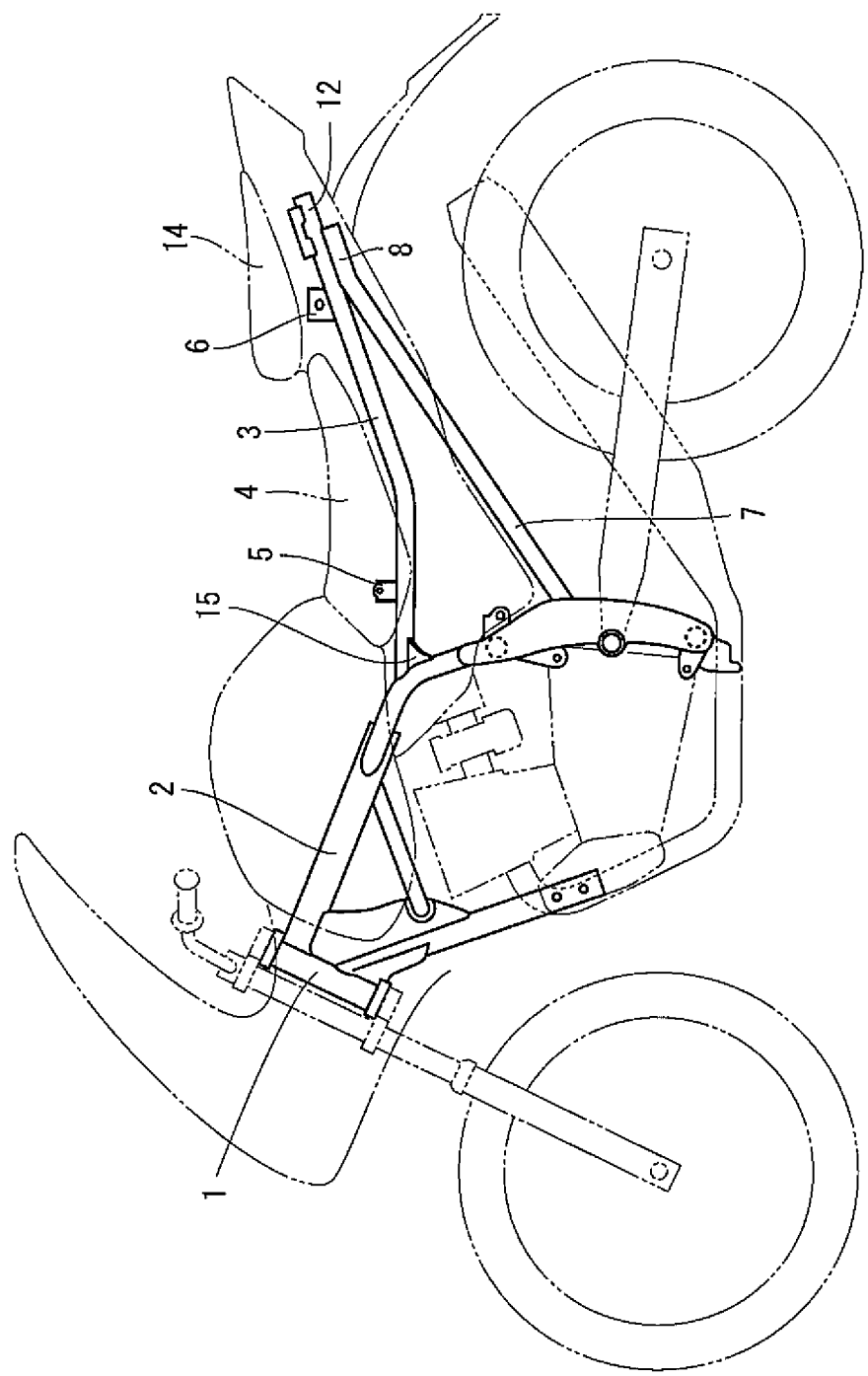
FIG. 1 is a side view of a motorcycle in accordance with a first embodiment of the invention.
Figure 2:
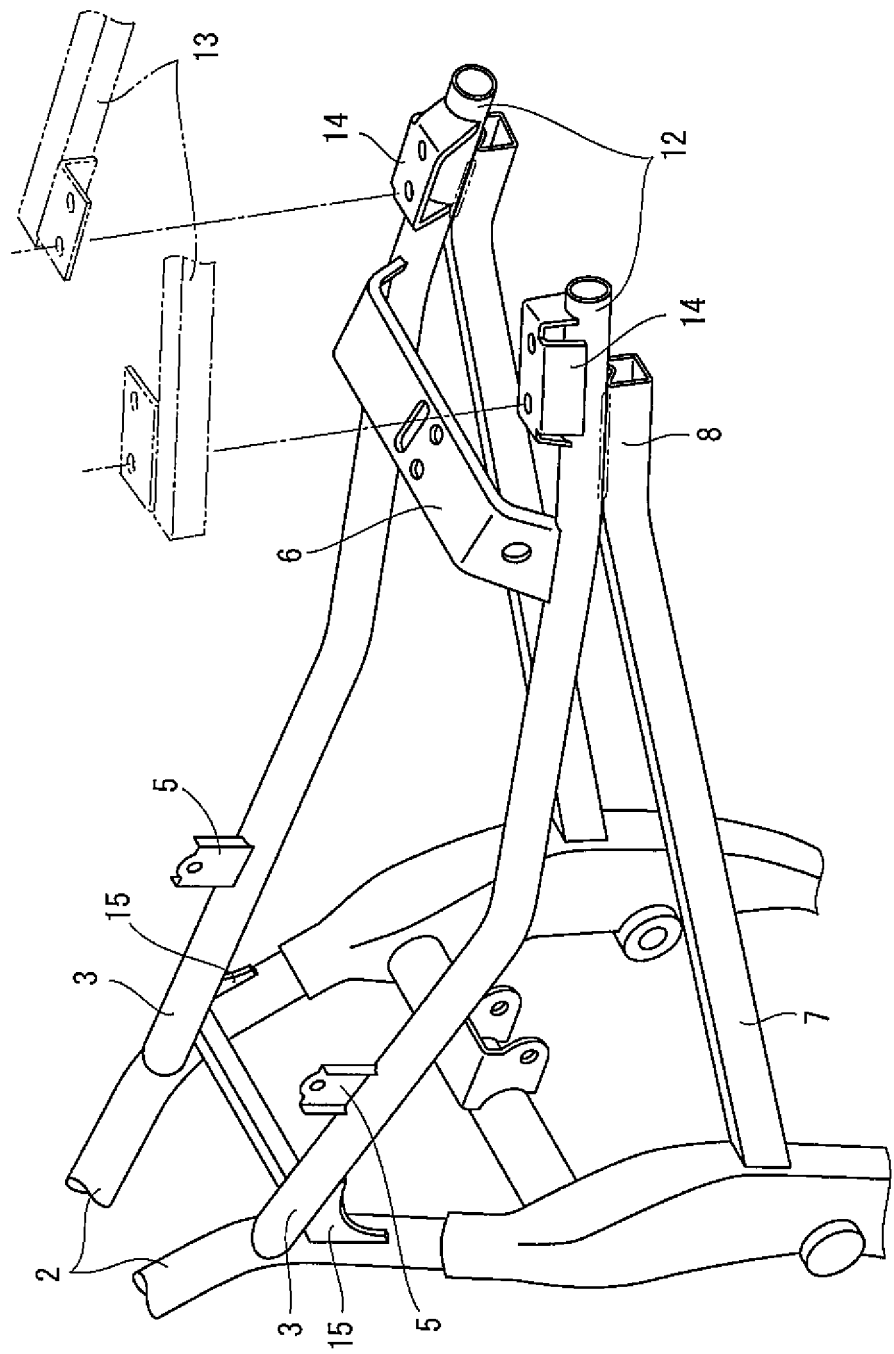
FIG. 2 is a perspective view showing a periphery of a connection part of a seat rail and a backstay of the motorcycle of FIG. 1.

A first embodiment (Embodiment 1) of the invention is described with reference to FIGS. 1-3. FIG. 1 shows a motorcycle to which the invention is applied. A body frame of the motorcycle comprises a head pipe 1 and right and left main frames 2 for supporting an engine. Right and left seat rails 3 extend rearward from upper ends of rear parts of main frames 2. Seat rail 3 and main frame 2 are fixed to each other by welding via a bracket 15 provided between a front end of seat rail 3 and main frame 2.

Seat rail 3 (corresponding to a first pipe in the invention) is formed from a circular pipe, which is used as a base material. Seat rail 3 extends substantially horizontally from its connection with main frame 2, and then bends slightly obliquely upward at a middle part thereof. Front side seat brackets 5 for fixing a front part of a seat 4 are formed on front ends of seat rails 3. A rear side seat bracket 6 for fixing a rear part of seat 4 is bridged over rear ends of seat rails 3.

Backstays 7 (corresponding to a second pipe in the invention) extend obliquely rearward from connections to lower rear parts of main frame 2. Backstay 7 is formed from a square pipe, which is used as a base material. A front end of backstay 7 is fixed to main frame 2 by welding. A rear end of backstay 7 bends on the slightly rear side of rear seat bracket 6 to form a bent part 8 facing the rear end of seat rail 3 along the longitudinal direction. Backstay 7 is connected to seat rail 3 at bent part 8 as described below.

Figure 3:
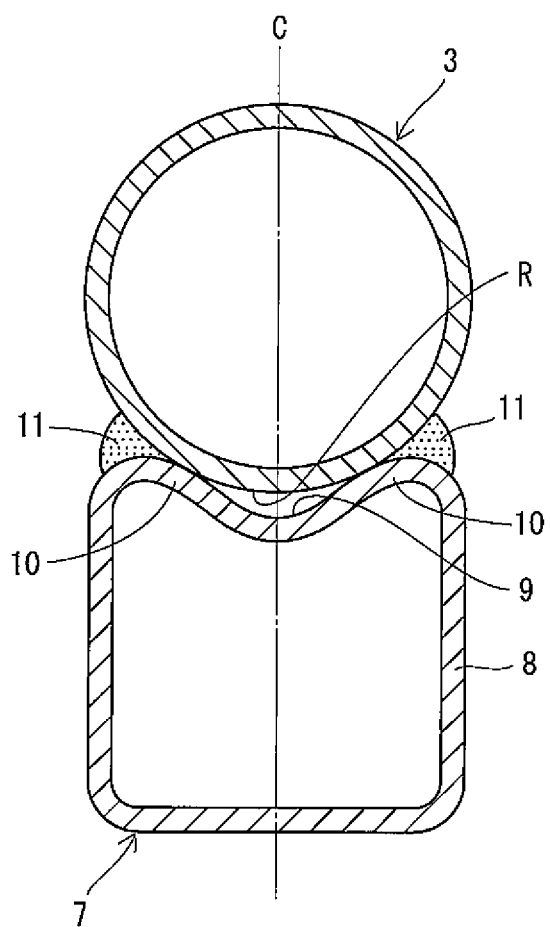
FIG. 3 is a sectional view of the connection part of FIG. 2.

FIG. 3 is an enlarged view of the connection between seat rail 3 and backstay 7. As shown in FIG. 3, seat rail 3 and backstay 7 have substantially the same outer width and face each other with their centers aligned in a vertical direction along a center line C.

The connection between seat rail 3 and backstay 7 is a connection between two pipes having different cross sections such as a square pipe (backstay 7) and a circular pipe (seat rail 3). Accordingly, where seat rail 3 faces backstay 7, a circumferential surface of seat rail 3 would form a curved surface R while that of backstay 7 would form a flat part. As previously described, the sideward opening angle between a curved surface and a flat part is narrow (FIG. 8), and it is difficult to access the center part with a welding torch. Therefore, in Embodiment 1, a concave groove 9 is formed at a center part of the flat part in the width direction by press-processing along the longitudinal direction to make both sides of concave groove 9 in the width direction relatively project and form projecting parts 10. Seat rail 3 contacts and is supported by projecting parts 10 in the longitudinal direction at places offset inward or outward in the width direction with respect to center line C. Welding is performed at the contacted and supported parts (welding parts 11) to connect seat rail 3 and backstay 7.

Concave groove 9 is formed with a curved bottom surface. The curvature of concave groove 9 is larger than that of curved surface R of seat rail 3. A gap is consequently formed along the longitudinal direction between concave groove 9 and curved surface R of seat rail 3. The gap is opened in the back-and-forth direction and functions as a drain, such as for draining rinse liquid when the body frame is rinsed before painting.

Rear ends of seat rails 3 project further rearward from rear ends of backstays 7 to form projections 12. Support brackets 14 are fixed to upper surfaces of the rear ends of seat rail 3 on a rear end. Glove bars 13 are mounted by support brackets 14. Each support bracket 14 is provided over the length of the projected part and overlaps with welding part 11 in the longitudinal direction.

The rear ends of backstays 7 and seat rails 3 are not aligned and only the rear ends of seat rails 3 project. This is to secure sufficient space for components at the rear end of the motorcycle. It is possible, of course, to align rear ends of seat rails 3 and backstays 7 if sufficient space is for components is still secured thereby.

The operation and effect of Embodiment 1 is now described. In forming the body frame, the front ends of seat rails 3 and backstays 7 are connected by welding or the like to upper and lower parts of the rear part of main frame 2. As shown in FIG. 3, when the rear end of seat rail 3 faces bent part 8 of backstay 7 along the longitudinal direction with their centers aligned in the vertical direction, seat rail 3 contacts and is supported in the longitudinal direction by projecting parts 10 of backstay 7, in particular, by inner surfaces close to the tops of projecting parts 10. Seat rail 3 is welded to backstay 7 along these peripheral contact parts. Welding parts 11 are offset inward or outward in the width direction with respect to center line C of seat rail 3 and backstay 7, so that a welding torch is not required to deeply enter between seat rail 3 and backstay 7 and a welding operation is easily performed. Further, providing projecting, parts 10 on both sides in the width direction allows welding part 11 to be arranged symmetrically with respect to center line C. Accordingly, the strength of connection between seat rail 3 and backstay 7 is improved and has good balance.

After completing a welding process as described above, the body frame is subject to a rinse process for removing grease and a drying process. Rinse liquid poured in the rinse process is drained through concave groove 9. Residue of the rinse liquid thus does not remain in a subsequent painting process.

As described above, in accordance with Embodiment 1, a pair of projecting parts 10 are provided in backstay 7 so as to be offset in the width direction with respect to center line C in connecting the facing part of seat rail 3 formed from a circular pipe and backstay 7 formed from a square pipe. Accordingly, a welding operation is easily carried out. Moreover, forming bent part 8 in backstay 7 so that a predetermined length of bent part 8 faces seat rail 3 for welding allows a certain length of welding part 11 to be secured to achieve predetermined strength of connection. Additionally, rinse liquid is drained through concave groove 9 in the center part of backstay 7 in the longitudinal direction, so that no rinse liquid remains between seat rail 3 and backstay 7. Furthermore, a part of support bracket 14 for mounting glove bar 13 overlaps the welding area in the longitudinal direction, that is, the connection area between seat rail 3 and backstay 7. Pulling or pushing force exerted on glove bar 13 by a tandem rider is thereby received in a double structural part and is resisted more effectively.

Other Embodiments

The invention is not limited to Embodiment 1 described herein. The following embodiments, for example, are also included in the scope of the invention. Various additional modifications can be carried out without deviating from the spirit and scope of the invention.

Figure 4:
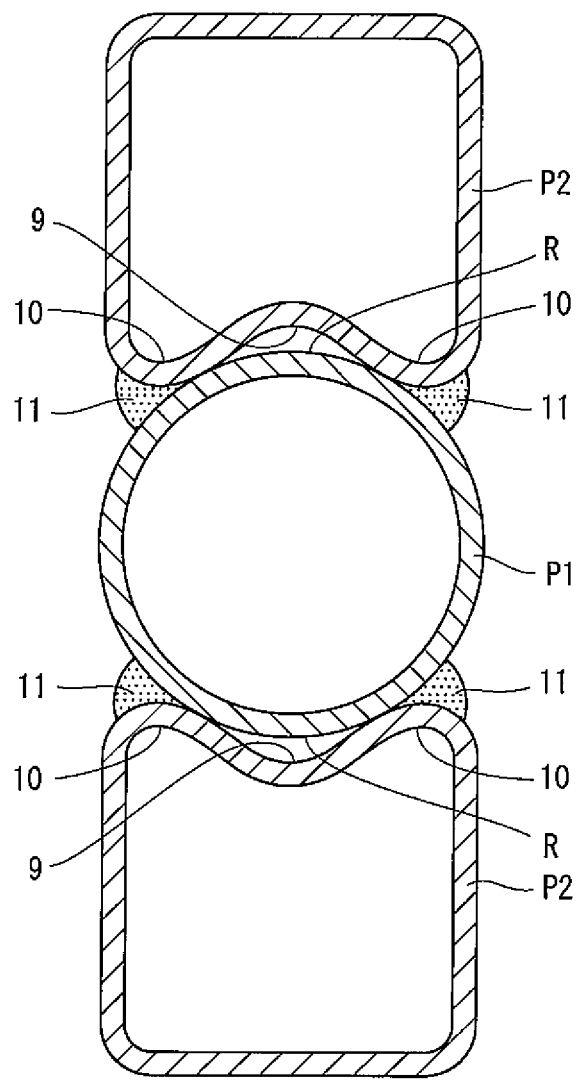
FIG. 4 is a sectional view of the connection part according to another embodiment of the invention.
Figure 5:
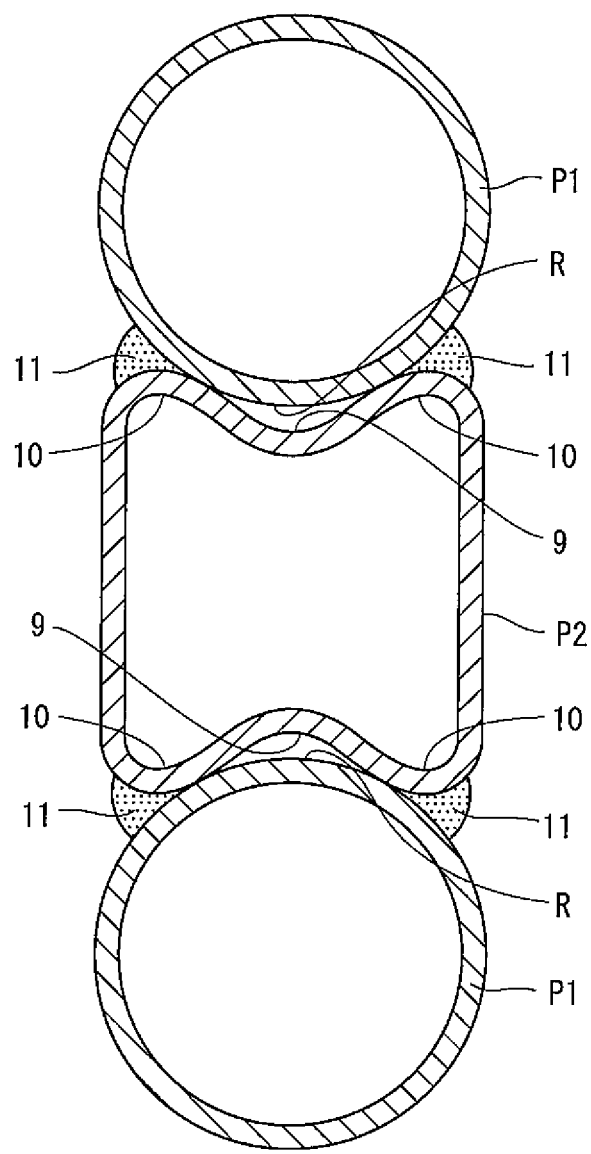
FIG. 5 is a sectional view of the connection part according to a further embodiment of the invention.

The number of first and second pipes is not limited to the case of Embodiment 1. Second pipes P2 may be connected on both sides of a first pipe P1 (FIG. 4), or first pipes P1 may be connected on both sides of second pipe P2 (FIG. 5), for example.

Figure 6:
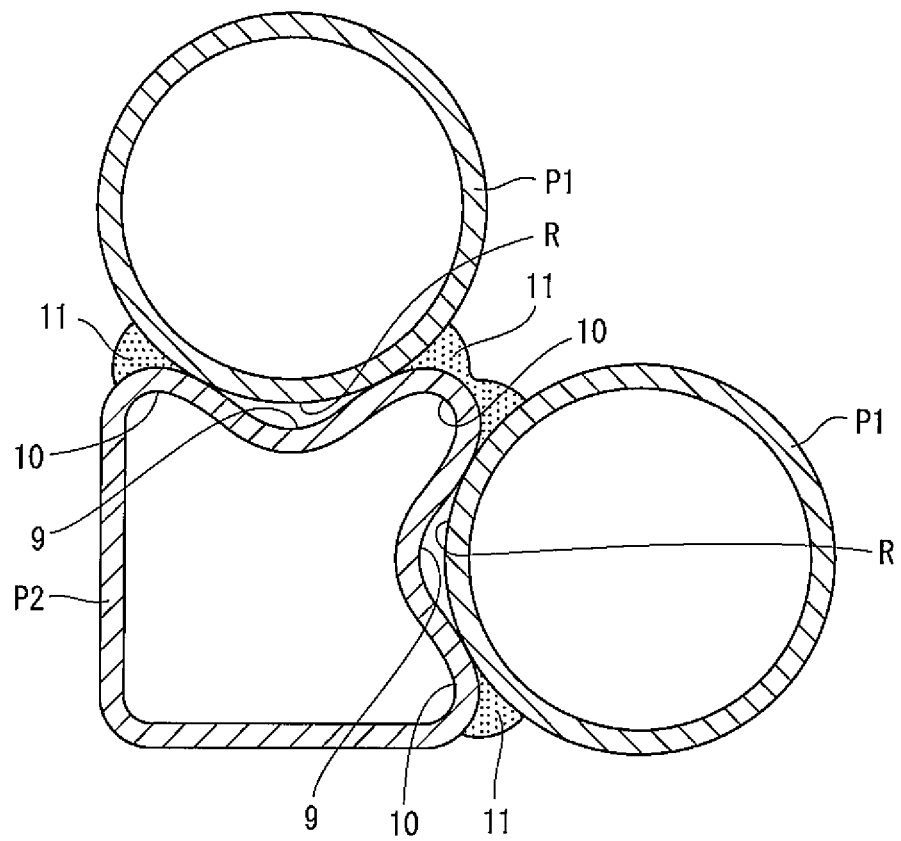
FIG. 6 is a sectional view of the connection part according to a still further embodiment of the invention.

Further, for example, one pipe does not necessarily sandwich the other pipe and may be provided at a position offset in a circumferential direction by a predetermined angle (FIG. 6).

Projecting part 10 is only required to be offset to an outer or inner side in the width direction with respect to a center axis of the curved surface part, and is not necessarily provided on both sides to form a pair, as in Embodiment 1.

The outer diameters of the first and second pipes are not limited. Thus, if the second pipe is a square pipe sufficiently wider than the first pipe, plural first pipes may be provided on a flat surface part of the second pipe in parallel to carry out welding.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A vehicle body frame comprising:
   a first pipe extending along an axial direction and including a curved surface part having an arc-shaped cross section;
   a second pipe extending along the axial direction and facing the curved surface part along the axial direction, the second pipe including a concave groove and a projecting part offset outward in a width direction with respect to a center line of the first and second pipes; and
   a welded part arranged to join the curved surface part and the projecting part to each other on each of first and second sides of the first and second pipes in the width direction; wherein
   a curvature of the concave groove in the second pipe is larger than a curvature of the curved surface part of the first pipe such that a gap is provided between the first pipe and the second pipe along a length of the welded part in order to drain liquids between the first pipe and the second pipe, and between the welded part on the first side of the first and second pipes and the welded part on the second side of the first and second pipes.

2. The vehicle body frame according to claim 1, wherein the first pipe is circular;
   the second pipe is square and has a width substantially equal to that of the first pipe;
   the concave groove is formed on a surface facing the first pipe through which the center line passes; and
   the projecting part is offset in the width direction with respect to the center line of the concave groove.

3. The vehicle body frame according to claim 2, wherein the projecting part includes first and second projecting parts provided on both sides of the concave groove in the width direction.

4. The vehicle body frame according to claim 1, wherein the concave groove has a curved bottom surface.

5. The vehicle body frame according to claim 1, wherein the first and second pipes are provided on both sides of the vehicle body frame in the width direction, and either the first pipes or the second pipes are seat rails arranged to support a seat.

6. The vehicle body frame according to claim 5, wherein the first pipe is a seat rail including a first end connected to an upper rear part of a main frame and a second end extending substantially horizontally rearward,
   the second pipe is a backstay including a first end connected to a lower rear part of the main frame and a second end extending obliquely upward and rearward,
   a bent part is formed at the second end of the second pipe and faces the second end of the first pipe along the axial direction, and
   the welded part is provided between the projecting part formed in the bent part of the second pipe and the second end of the first pipe.

7. The vehicle body frame according to claim 6, wherein a glove bar is arranged to extend over rear ends of the seat rails.

8. The vehicle body frame according to claim 7, wherein a support bracket arranged to mount the glove bar is provided at the rear ends of the seat rails and overlaps a connection between the seat rail and the bent part in the axial direction.

9. The vehicle body frame according to claim 1, further comprising another second pipe, wherein the two second pipes are connected on the first and second sides of the first pipe, respectively.

10. The vehicle body frame according to claim 1, further comprising another first pipe, wherein the two first pipes are connected on the first and second sides of the second pipe, respectively.

11. A motorcycle comprising:
    the vehicle body frame according to claim 1.

12. A body frame for a motorcycle, the body frame comprising:
    a main frame;
    a seat rail including a circular cross section and extending rearward from an upper rear part of the main frame; and
    a backstay including a square cross section and extending rearward and upward from a lower rear part of the main frame to a connection with the seat rail, wherein
    a concave groove and projecting parts are provided on a surface of the backstay at the connection with the seat rail, the projecting parts being welded to the seat rail on each of first and second sides of the seat rail and the backstay in a width direction of the body frame; and
    a curvature of the concave groove in the backstay is larger than a curvature of the circular cross section of the seat rail such that a gap is provided between the seat rail and the backstay in the connection between the seat rail and the backstay along a length of the welded projecting parts in order to drain liquids between the seat rail and the backstay, and between the projecting parts welded to the seat rail in the width direction.

13. The body frame according to claim 12, wherein the seat rail and the backstay are aligned about a vertical center line at the connection, and the projecting parts are offset from the center line in a width direction.

14. The body frame according to claim 13, wherein the concave groove is defined between the projecting parts.

15. A motorcycle comprising:
    the body frame according to claim 12.

16. A vehicle body frame comprising:
    a circular pipe extending along an axial direction and including a curved surface portion having an arc-shaped cross section;
    a square pipe extending along the axial direction and facing the curved surface portion of the circular pipe along the axial direction, the square pipe including a pair of projecting portions and a concave groove on a surface facing the circular pipe, the pair of projecting portions being offset outward in a width direction with respect to the concave groove and a center line of each of the circular pipe and the square pipe; and
    a welded portion arranged to join the curved surface portion and the pair of projecting portions to each other on each of first and second sides of the circular pipe and the square pipe in the width direction; wherein a curvature of the concave groove in the square pipe is larger than a curvature of the curved surface portion of the circular pipe such that a gap extends in the axial direction along a length of and between the welded portion on the first sides of the circular pipe and the square pipe and the welded portion on the second sides of the circular pipe and the square pipe, the gap being arranged to drain liquids between the circular pipe and the square pipe.

* * * * *